Jan. 28, 1969  R. B. EMERY ET AL  3,424,504
THRUST BEARING INCORPORATING A RESILIENT, FRICTIONAL
MEMBER AND METHOD OF ASSEMBLY THEREOF
Filed Nov. 9, 1966
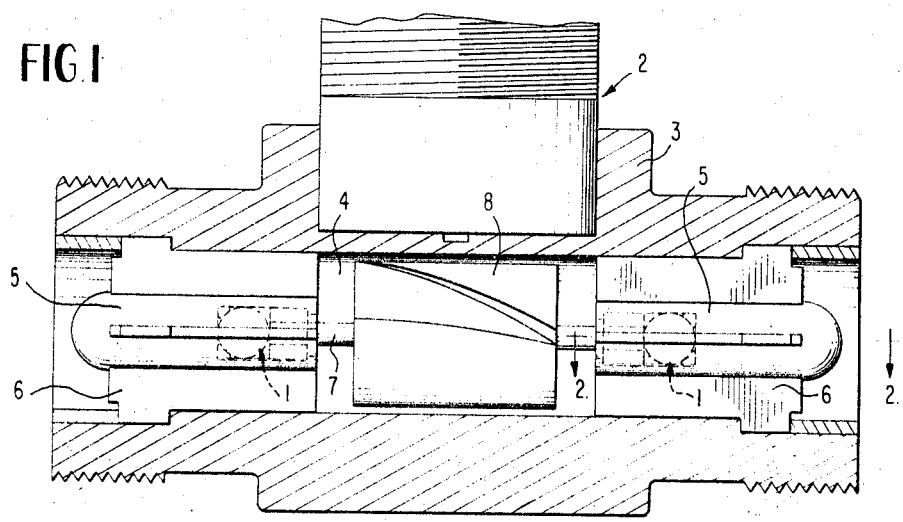
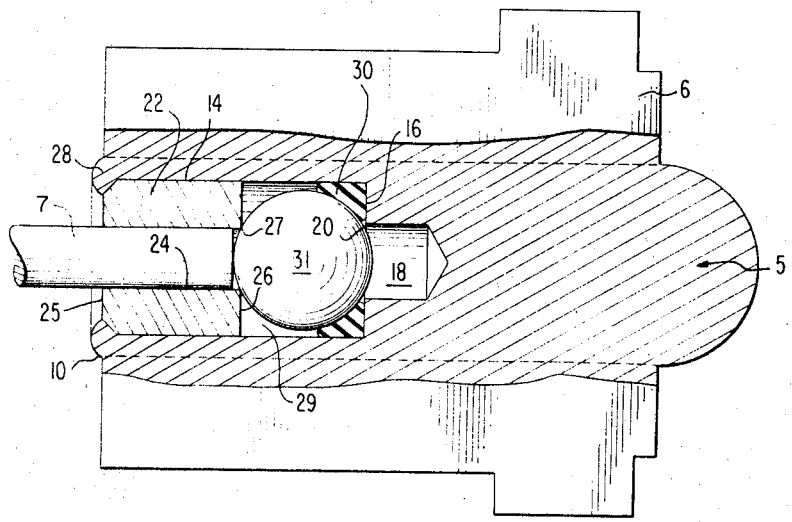
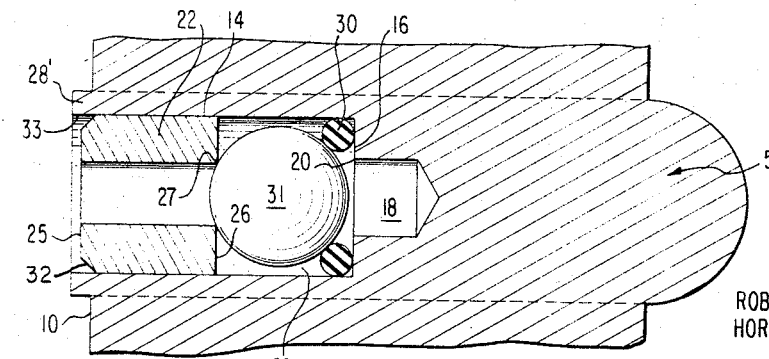
INVENTORS
ROBERT B. EMERY
HORACE J. HOMRIG
BY Burns, Doane, Benedict,
Sweeker & Mathis
ATTORNEYS United States Patent Office 3,424,504
Patented Jan. 28, 1969

3,424,504
THRUST BEARING INCORPORATING A RESILIENT, FRICTIONAL MEMBER AND METHOD OF ASSEMBLY THEREOF
Robert B. Emery and Horace J. Homrig, Duncan, Okla., assignors to Halliburton Company, Duncan, Okla., a corporation of Delaware
Filed Nov. 9, 1966, Ser. No. 593,068
U.S. Cl. 308—37    5 Claims
Int. Cl. F16c 17/04, 19/04, 19/10

ABSTRACT OF THE DISCLOSURE

A bearing for a rotary shaft which is mounted in a housing. The housing includes an elongated bore with a shoulder adjacent the bottom of the bore. A sleeve is retained in the bore as a radial bearing for the shaft. A thrust member is positioned in the bore between the sleeve and the shoulder. A resilient, frictional member is deformingly interposed between the thrust member and the shoulder. The resilient member frictionally prevents rotation of the thrust member and provides cushioning against axially directed external loads on the thrust member.

---

This invention relates to bearings for rotating shafts, and more particularly, to thrust bearings.

When a shaft is mounted for rotation in an environment where it is subjected to axial loading, it is customary to provide a thrust bearing to resist axial displacement of the shaft. One common type of thrust bearing is characterized by a bearing portion extending about the periphery of the shaft adjacent one end. A thrust member is interposed between the radial end face of the shaft and a seat which retains the thrust member in contact with the end of the shaft. It has been proposed to use a hardened metal ball for the thrust member in order to reduce the friction between the thrust member and the shaft. Bearings of this type are utilized for a variety of purposes and in particular for mounting rotating shafts in precision instruments, such as flow measuring turbines, gyroscopes and the like.

Thrust bearings as described, though generally adequate, may sometimes prove unsatisfactory for a number of reasons. For example, there may frequently be sufficient frictional engagement between the radial end face of the rotating shaft and the ball thrust member to rotate the ball relative to its seat, thereby causing undesirable wearing of the seat.

In situations where random external forces are imposed axially on the shaft, the ball thrust member may be damaged in absorbing the impact of these axial forces. Irregular axial loading may occur in flow meters functioning in liquid streams, or in gyroscopes used in projectiles subjected to violent acceleration forces, for example.

It is therefore an object of the present invention to provide an improved thrust bearing.

It is a further object of the present invention to provide a thrust bearing which minimizes wear between the thrust member and the seat.

Another important object of the present invention is to provide a thrust bearing which dampens the effects of intermittently applied, axial forces on the shaft.

These objects are accomplished in accordance with a preferred embodiment of the invention by a bearing housing in which one end of a shaft is mounted for rotation relative to a body. The housing includes a bore in which a bearing sleeve is received. The sleeve forms a radial bearing for the shaft, but does not extend the full length of the bore. A shoulder in the bore is spaced from the end of the sleeve to form a chamber between the sleeve and the shoulder. A thrust member in the chamber is positioned opposite the end face of the shaft, and a resilient packing member is also positioned within the chamber between the thrust member and the shoulder. The packing member prevents the thrust member from rotating relative to the body concurrently with the shaft by the frictional properties of the resilient member. At the same time, intermittent shock loads applied axially of the shaft by external forces are dampened by the packing member.

This preferred embodiment is illustrated in the accompanying drawings, in which:

FIGURE 1 is a cross sectional view of a flow meter in which the turbine shaft is supported in bearings according to the present invention;

FIGURE 2 is an enlarged detail view, partially in cross section of the shaft bearing; and FIGURE 3 is a detail view, as in FIGURE 2, but showing an earlier stage in the assembly of the bearing.

Referring to FIGURE 1, two thrust bearings 1 exemplifying a preferred embodiment of the present invention, are shown installed in a turbine flow meter 2 of the type more fully disclosed in the copending application of Horace J. Homrig, Ser. No. 534,375 filed Mar. 15, 1966. Although the bearing of the present invention may be utilized in other applications than that of the flow meter shown in FIGURE 1, this serves as a typical illustration of the environment in which the bearing may be used.

The flow meter 2 includes a body 3 provided with an axially extending passage 4 through which fluid is directed. Two opposed, spaced, axially extending bearing housings 5, concentric with the passage 4, are supported therein by radially projecting vanes 6. The previously mentioned bearings 1 are mounted in the bearing housings 5 and support the ends of a turbine shaft 7 on which is mounted a turbine 8 adapted to be rotated by the flow of fluid through the passage 4.

Referring to FIGURE 2, the housing 5 includes a forward end 10. A longitudinal bore 14 extends from the forward end into the housing 5. The bore 14 is countersunk to form a radial shoulder 16 that is spaced from the closed bottom portion 18 of the bore 14. The intersection of the portion 18, and the shoulder 16 defines a circular edge 20.

In order to support the end of the shaft 7 in the housing 5, an annular sleeve 22 is mounted adjacent the forward end of the bore 14. The outer diameter of the sleeve 22 is only slightly smaller than the diameter of the bore 14. The sleeve 22 has a bearing surface 24 in which the end portion of the shaft 7 is journalled. The sleeve 22 also includes forward and rear, flat radial end faces 25 and 26, respectively. The intersection of the rear end face 26 with the bearing surface 24 defines a circular edge 27. At the opposite end, the sleeve 22 is retained within the bore 14 by a flange 28 on the housing 5.

The sleeve end face 26 and the shoulder 16 define a chamber 29 in the bore 14. An annular, resilient frictional member 30 and a thrust member 31 are positioned in the chamber 29. The resilient member 30 is arranged in abutting contact with the shoulder 16 and the surface of the bore 14. The member 30 may be in the form of an O-ring.

The thrust member 31 is positioned between the sleeve 22 and the resilient member 30. In the preferred embodiment the thrust member 31 comprises a spherical hardened metal ball. However, other configurations of the thrust member 31 may be provided. The surface of the thrust member 31 engages the sleeve 22 along the edge 27, as shown in FIGURE 2. The rotary shaft 7 extends into the sleeve 22 and the radial end face of the shaft engages the surface of the thrust member 31. Thus, there is a minimal surface area of contact between the shaft 7 and the member 31 and the contact area is at the center of the shaft 7.

The opposite side of the thrust member 31 contacts the resilient member 30. The length of the chamber 29 between the rear end face 26 of the sleeve 22 and the shoulder 16 is such that the resilient member 30 is deformed by the thrust member 31 into the configuration shown in FIGURE 2. In this configuration, the restoring forces exerted by the natural resiliency of the member 30 provide sufficient frictional resistance to prevent rotation of the thrust member 31 relative to the housing 5, despite the frictional contact between the rotating shaft 7 and the thrust member 31 at their point of mutual contact. In this manner, the thrust member 31 is held stationary relative to the housing 5, so that undesirable wearing of the member 31 is effectively minimized.

Utilization of a resilient member 30 in the form of an O-ring concentric with the bearing surface 24 of the sleeve 22 advantageously ensures that the ball thrust member is supported symmetrically relative to the center of rotation of the shaft and is automatically centered with respect thereto.

In order to permit the resilient member 30 to absorb any axial shock loads on the shaft 7, the edge 20 is spaced from the thrust member 31 by the member 30. In this manner, the thrust member 31 may move longitudinally in the chamber 29 relative to the housing 5 in response to axial shock loads. Accordingly, these loads are absorbed by resilient deformation of the member 30.

The method of assembling the thrust bearing may be seen by referring to FIGURE 3. The flange 28 which retains the sleeve 22 in the bore 14 initially is in the form of an outwardly projecting rim 28' around the open end of the bore 14. The rim 28' includes an interior surface 33 which is a continuation of the interior surface of the bore 14.

In assembling the thrust bearing, the resilient member 30 is first placed in the bore 14 against the shoulder 16. The thrust member 31 is then placed in contact with the resilient member 30, after which the sleeve 22 is slid within the bore 14. At this time, the sleeve, thrust member and resilient member occupy the positions shown in FIGURE 3.

In a final operation, the rim 28' is crimped over the end of the sleeve 22. During this operation, the face 33 of the rim 28' is moved into abutting contact with a chamfered edge 32 on the sleeve 22 and at the same time the sleeve 22 is moved rearwardly to displace the thrust member 31 into contact with the resilient member 30 with sufficient force to deform the member 30. A suitably contoured press tool may be used for crimping the rim 28', so that at the conclusion of crimping, the flange 28 is provided with an arcuate outer surface, as shown in FIGURE 2.

The thrust bearing of this invention is resistant to wear. In particular, the frictional resistance between the ball member and the housing afforded by the resilient member ensures that rotation of the thrust member relative to the body is effectively prevented, thereby minimizing wear of the ball member during use. Another significant advantage afforded by the use of the resilient member is the ability of that member to absorb intermittent shock loads acting axially of the shaft. A further advantage is derived from the self centering properties imparted to the ball thrust member relative to the shaft by the utilization of a resilient member of O-ring configuration.

Although the invention is described with reference to a preferred embodiment, it will be apparent to those skilled in the art that additions, deletions, modifications, substitutions and other changes not specifically described and illustrated in the preferred embodiment may be made which will fall within the purview of the appended claims.

What is claimed is:

1. A bearing for mounting one end of a rotary shaft in a body comprising:

a housing, said housing having an elongated chamber therein, said chamber having at least one open end, a sleeve in said chamber adjacent the open end thereof, said sleeve having an internal bearing surface defining a sleeve passage extending axially from one end to the other of said sleeve, said bearing surface being adapted to rotatably receive an end portion of the shaft, a ball thrust member in said chamber adjacent an end of said sleeve, said thrust member having a thrust bearing surface extending across said sleeve passage, and a resilient frictional member within said chamber on an opposite side of said thrust member from said sleeve, said sleeve forcing said thrust member against said resilient member maintaining said resilient member in resiliently deformed condition between said thrust member and adjacent portions of said housing, said resilient member being operative to resiliently cushion said thrust member against axial displacement and to frictionally resist rotation of said thrust member.

2. A bearing in accordance with claim 1 wherein said chamber includes:

shoulder means projecting within said chamber, said resilient member being positioned between said thrust member and said shoulder, whereby said resilient member absorbs axial loads on said rotary shaft.

3. A bearing in accordance with claim 1 wherein:

said chamber includes a shoulder spaced from said open end, said sleeve being spaced from said shoulder, said resilient member being positioned between said shoulder and said thrust member, whereby axial loads on said shaft displace said thrust member toward said shoulder and compress the resilient member therebetween.

4. A bearing in accordance with claim 3 wherein said resilient member is in the form of an annular ring and is substantially coextensive with said shoulder.

5. In a bearing for a rotary shaft of the type having a housing, said housing including an elongated bore therein with a shoulder adjacent the bottom of the bore, a sleeve retained in the bore as a radial bearing for the shaft, and a ball thrust member between the sleeve and the shoulder, the improvement comprising:

a resilient frictional member deformingly interposed between said ball and said shoulder, said resilient member being in the form of a ring, said sleeve forcing said ball thrust member against said resilient member to frictionally resist rotation thereof, whereby said resilient member centers said ball in said bore and minimizes wear on said ball.

References Cited

UNITED STATES PATENTS

| | | | |
|---|---|---|---|
| 652,819 | 7/1900 | Theiring | 308—159 X |
| 1,305,824 | 6/1919 | Mayer | 308—159 |
| 1,366,132 | 1/1921 | Pitkin | 308—159 X |
| 2,351,588 | 6/1944 | Field | 308—159 X |
| 2,969,172 | 1/1961 | Hutt | 308—159 X |
| 3,050,350 | 8/1962 | Loretan | 308—159 |
| 3,062,598 | 11/1962 | Summers | 308—160 |
| 2,720,077 | 10/1955 | Stein | 308—159 X |
| 2,849,855 | 9/1958 | Seitz | 308—158 X |
| 3,050,351 | 8/1962 | Kempf | 308—163 X |
| 3,159,045 | 12/1964 | Lohr | 308—163 X |
| 3,197,894 | 8/1965 | Ratkowski | 308—264 X |

MARTIN P. SCHWADRON, *Primary Examiner.*

L. L. JOHNSON, *Assistant Examiner.*

U.S. Cl X.R

308—159, 163